United States Patent [19]

Vance, Jr.

[11] 4,106,455
[45] Aug. 15, 1978

[54] VAPORIZER SYSTEM FOR GASOLINE ENGINES

[76] Inventor: Robert Vance, Jr., 116 E. 25 St., Huntington Station, N.Y. 11746

[21] Appl. No.: 760,132

[22] Filed: Jan. 6, 1977

[51] Int. Cl.² ............................................ F02M 31/00
[52] U.S. Cl. ................................ 123/122 E; 123/133
[58] Field of Search .................. 123/122 E, 133, 34 A

[56] References Cited

U.S. PATENT DOCUMENTS

| | | | |
|---|---|---|---|
| 2,746,440 | 5/1956 | Eriksen | 123/133 |
| 3,738,334 | 6/1973 | Farr | 123/122 E |
| 3,986,486 | 10/1976 | Rabbiosi | 123/133 |
| 4,003,356 | 1/1977 | Naylor | 123/133 |

FOREIGN PATENT DOCUMENTS 312,476  11/1933  Italy ......................... 123/133

Primary Examiner—Ronald H. Lazarus
Attorney, Agent, or Firm—Clarence A. O'Brien; Harvey B. Jacobson

[57] ABSTRACT

A vaporizer system for gasoline engines having a coil added to the oil reservoir of a conventional type internal combustion engine for heating liquid fuel from the storage tank associated with the engine. The fuel which becomes vaporized in the heat exchanger in the oil reservoir is maintained in a vapor state by further heat exchange relationship with the exhaust manifold system of the engine. The vapor fuel is fed to a carburetor designed for the use of gas vapor fuel. An additional feature of this invention is a hand controllable pressure pump for the storage tank of the liquid fuel which is maintained under airtight conditions in normal operation.

7 Claims, 2 Drawing Figures

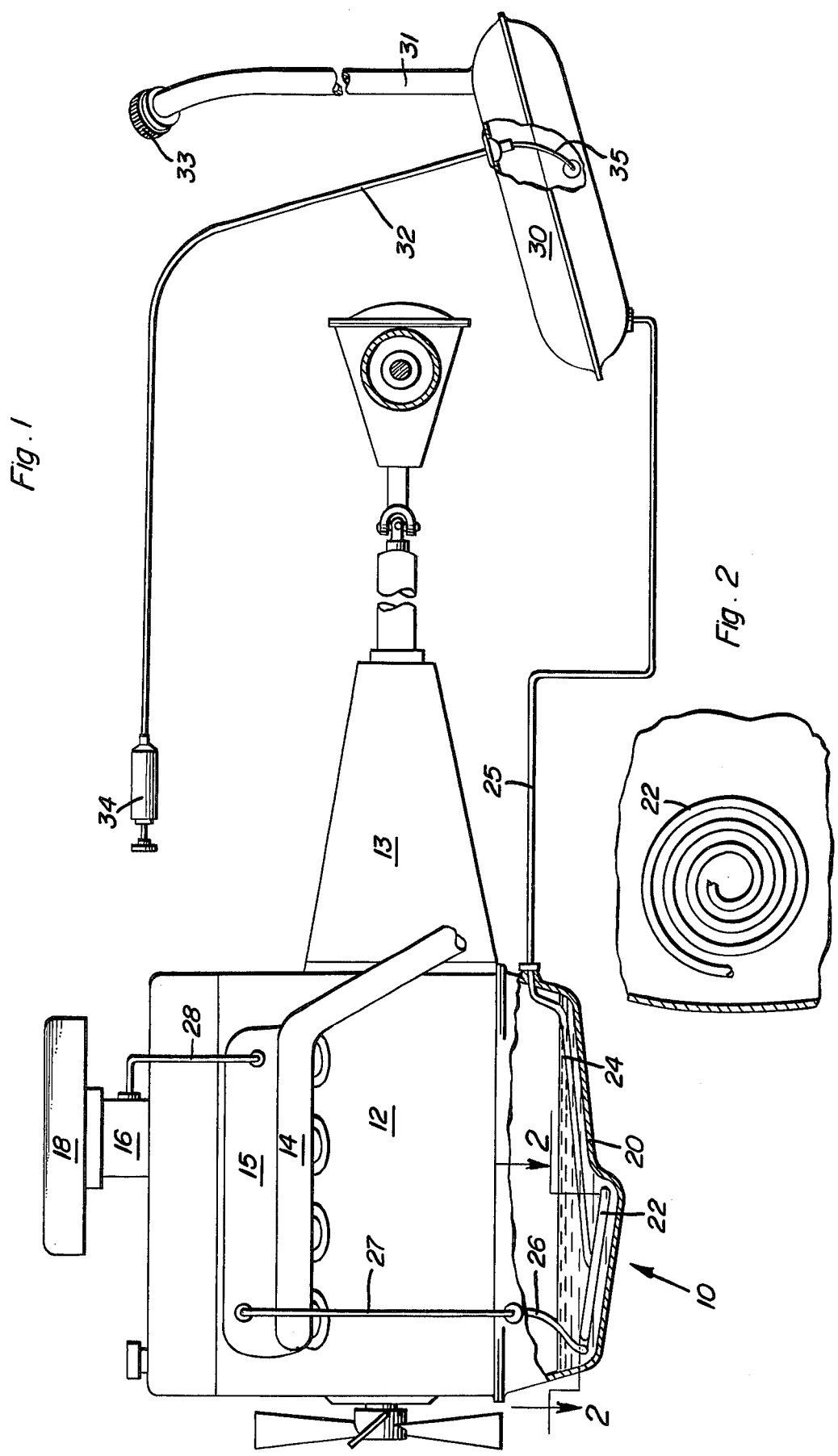

VAPORIZER SYSTEM FOR GASOLINE ENGINES

BACKGROUND OF THE INVENTION

1. Field of the Invention

This invention relates generally to devices for use with internal combustion engines and specifically for vaporizing the conventional liquid-type fuel into a gas vapor prior to use by said engine for increased efficiency and reduced pollutants.

2. Description of the Prior Art

It is known in the prior art to vaporize liquid fuel into the gaseous state by the use of heat exchange systems in contact with the hot exhaust manifolds of the engines with which the fuel is used. Also, such systems are known using heat exchange systems associated with the muffler and tailpipe systems of such engines. Other combinations use the engine coolant system for heating the liquid fuel. However, it is not known to use the pressure oil system and the oil sump normally associated therewith for heat exchange purposes for heating the fuel from a liquid to a gaseous state.

Another problem with known type devices employing conventional type fuel supply systems is that a fuel pump of positive actuation type is usually used with such a system, and once the fuel is vaporized into a gas, the pressure of such fuel pump is detrimental because it is too great.

Another problem with known type devices is that they are unduly complicated and normally cannot be easily installed as an add-on unit to conventional vehicle type engine drive systems.

Known prior art devices which may be pertinent to this invention are listed as follows: U.S. Pat. Nos. 1,339,465 — May 11, 1920, 1,536,499 — May 5, 1925, 1,925,032 — Aug. 29, 1933, 2,033,575 — Mar. 10, 1936, 2,103,902 — Dec. 28, 1937.

None of these devices offers the new and novel features of the invention disclosed herein.

SUMMARY OF THE INVENTION

An object of the present invention is to provide a vaporizer system for gasoline engines of the internal combustion type which will change the fuel normally used from the liquid state into a gas or vapor state prior to induction into said internal combustion engine.

Another object of this invention is to provide a vaporizer system for gasoline engines using a heat exchange coil in the oil reservoir or sump of the internal combustion engine for heating the liquid fuel normally used with said engine into a gas state prior to induction into same.

A further object of this invention is to provide a fuel system for gasoline engines which will permit the user of the device to pressure feed fuel which is liquid into a combination heat exchange system associated with the engine which will heat the liquid fuel by both a heat exchange unit in combination with the oil sump of the engine as well as a heat exchange system with the exhaust system of the engine. The advantage of this combination system is that the liquid fuel is vaporized in the first oil heat exchange unit and then maintained in the vapor state by the exhaust heat exchange unit until inducted into the engine by a conventional type gas vapor carburetor system.

The invention disclosed herein has a number of new and unique features associated therewith. This invention is designed to be used with a conventional gasoline engine system normally provided with a liquid fuel storage tank, a conventional type cooling system, a lubricating pressure oil system with oil reservoir or sump at the lower portion of said engine, an exhaust manifold with exhaust system, and a conventional intake manifold and carburetor or induction unit. To such an existing system, the units of this invention are added. These units consist of a primary heat exchange coil which is mounted within the oil pan providing the oil reservoir or oil sump for the engine. Appropriate connectors are used to provide an input and output for this heat exchange unit. The input of the heat exchange unit is connected to the liquid fuel storage tank of the engine system and the vehicle with which it is associated. This storage system, if not already of the pressure type, is modified so as to be airtight and able to withstand a build-up of pressure therewithin. An additional hand pump is added and connected to this storage tank so that desired air may be added under pressure to said tank to form a pressure feed of the liquid fuel contained therewithin. An output from the oil heat exchange unit is connected to a second heat exchange unit associated with the exhaust manifold of the engine and from there is fed to the induction system of said engine which is modified or adapted for gas vapor type fuel.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the device of this invention.

FIG. 2 is a fragmentary top view, taken generally along line 2—2 of FIG. 1, showing the primary heat exchange coil per se.

DESCRIPTION OF THE PREFERRED EMBODIMENT

Referring to FIG. 1 of the drawings, reference numeral 10 indicates in general the vaporization system for gasoline engines of this invention.

The basic gasoline engine is indicated by reference numeral 12 having an exhaust manifold 14 leading to a conventional exhaust system such as a muffler and tail pipe. Associated with the exhaust manifold 14 is a heat exchange unit 15 which feeds fuel, which has already been vaporized into a gas vapor state, into an induction unit such as a low pressure gas vapor carburetor 16. An air filter 18 for removing impurities from the air being inducted for mixing with the fuel is normally also provided. A transmission 13 for connection to the remaining drive train units of conventional nature is also indicated.

The primary component unit of this invention is the coil 22, shown in plan view in FIG. 2, which is mounted at a low point of the oil pan 20 for the internal combustion engine. Normally oil pans are provided with a low point from which area the pickup inlet for the oil pump is normally placed. The primary heat exchange coil 22 is preferably placed in this same area, it being important that the heat exchange coil 22 be completely surrounded and covered by the liquid oil of the lubrication system of the engine. An input line 24 is normally fed through one wall, or end of the oil pan, for connection to a line 25 which is in turn connected to the gasoline liquid fuel storage tank of the vehicle, or device with which the engine is being used. An output line 26 similarly is connected between the other end of the coil 22 and a line 27 which feeds to a coil (not shown) of a secondary heat exchange unit 15 for the system.

The gasoline liquid fuel storage tank 30, which is commonly associated with internal combustion engines of the type with which this invention is to be used, may or may not be normally pressure tight or pressure fed. A float arm 35 usually is provided to indicate the level of liquid fuel within the tank and connected to appropriate gasoline or fuel reading gauges on the dash of a vehicle, or at another appropriate point for easy viewing by the operator of the engine and associated system. A fuel filler tube 31 is integrally fastened to the tank and provided with a cap 33. The cap 33 should be of the pressure containing type without any air vents therein. Preferably, a line 32 is added together with a hand operated pressure pump 34 which may be mounted on the dash of the vehicle, or other appropriate point close to the operator for easy access of same by the operator. If the fuel system with which this device is installed includes an electric fuel pump and/or engine driven fuel pump, such fuel pump is normally eliminated from the system. The reason for this will be described in detail below. In other words, normally a vehicle having an internal combustion engine would have a fuel pump provided in a line similar to that of 25 feeding to the carburetor system of the engine. In the system of this invention, such a positive feed fuel pump would be eliminated.

The operation of the device will now be described in detail. When the engine is cold and the only fuel available for the engine is of the liquid type, the operator of the engine and system will apply pressure to the storage tank 30 by means of the hand pump 34. When sufficient pressure has been added to the tank 30, liquid fuel will be forced through the line 25, through 24 into coil 22, out 26 and through line 27 into the coil of heat exchanger 15, and through line 28 into the carburetor or induction unit 16. This initial shot of fuel will be sufficient to start the engine, and once the engine is running, the exhaust manifold 14 will very quickly heat up sufficiently to vaporize the liquid in heat exchange unit 15 and supply gas or vapor fuel to the induction unit 16. As the engine continues to run with liquid fuel continuing to be fed by means of the pressure pump 34, the lubricating oil of the internal combustion engine will soon heat up to operating temperature, at which time the liquid fuel passing through the coil 22 will become vaporized into a gas state. Thus, at this point the fuel leaving the line 26 and passing through connecting line 27, will be in vapor form, and the exhaust manifold heat exchange unit 15 will merely maintain same in a vapor form. Upon reaching this state of operation, the operator may dispense with further operation of the hand pump 34, since the liquid fuel contained within tank 30 will continue to flow through line 25 into the coil 22 by gravity action and the vaporization of the fuel into the gas vapor state will create a vacuum on the far side of the primary heat exchange coil 22 and in lines 26 and 27, etc. At this point, the maximum efficiency may be derived from the fuel and a much better mixture of the fuel in vapor state together with the inducted air may be achieved by the carburetor unit 16.

For proper operation of the system it is important that the only pressure applied to the system be by means of the hand pump 34 and any fuel pumps of a positive continuous operation type be eliminated. More efficient combustion of the fuel is achieved by this system with reduced pollutants being exhausted from the internal combustion engine with which it is used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combustion engine system, the engine provided with means for burning fuel therewithin, an exhaust system associated therewith, a fuel induction system, an oil lubricating system with engine oil sump, and a liquid fuel storage tank, the improvement comprising means for applying pressure to said storage tank, and further means for converting the liquid fuel to vapor form prior to feeding to the engine fuel induction system, the means for converting the liquid fuel to the vapor form including a heat exchange unit mounted in the engine oil sump for the purpose of absorbing heat from the engine oil when hot in order to vaporize the liquid fuel to a gas.

2. The structure set forth in claim 1, wherein the means for applying pressure to the liquid fuel storage tank includes a pressure pump connected to said storage tank and easily operable by a user of the system in order to apply the needed amount of pressure to the storage tank to initially force liquid fuel through the system when the engine and oil therein are cold.

3. The structure set forth in claim 2, wherein the engine system is mounted in a vehicle, and the pressure pump is mounted on the dash of said vehicle.

4. The structure set forth in claim 3, together with further means to maintain the fuel in a gas vapor state after it has been changed thereinto and prior to induction into the engine fuel induction system, said further means including a heat exchange unit associated with the exhaust system of the internal combustion engine.

5. In combination with a combustion engine provided with means for burning fuel therewith, an exhaust system and a fuel induction system associated therewith, an oil lubricating system associated therewith including an engine oil sump, and a liquid fuel storage tank, the improvement comprising fuel passge means for conveying liquid fuel from said tank to said fuel induction system, said fuel passage means including heat exchanger means connected in said fuel passage means for the flow of fuel therethrough upon its movement from said tank to said fuel induction system, said heat exchanger means being disposed within said engine oil sump for absorbing heat from the engine oil when hot in order to vaporize the liquid fuel into a gas.

6. The structure set forth in claim 5, together with further means for applying pressure to the fuel in the liquid state within said tank for forcing said liquid fuel through the passage means.

7. The structure as set forth in claim 6 including additional means associated with said passage means for keeping the vaporized fuel in a gaseous state comprising another heat exchanger means operatively connected in said passage means and operatively associated with the exhaust system of the engine in order to keep the vapor fuel at high enough temperature to stay a gas.

* * * * *